US010591731B2

(12) United States Patent
Davami

(10) Patent No.: US 10,591,731 B2
(45) Date of Patent: Mar. 17, 2020

(54) OCULAR VIDEO STABILIZATION

(71) Applicant: Google LLC, Mountain View, CA (US)

(72) Inventor: Erfan Davami, Newark, CA (US)

(73) Assignee: Google LLC, Mountain View, CA (US)

(*) Notice: Subject to any disclaimer, the term of this patent is extended or adjusted under 35 U.S.C. 154(b) by 210 days.

(21) Appl. No.: 15/793,023

(22) Filed: Oct. 25, 2017

(65) Prior Publication Data

US 2018/0157045 A1   Jun. 7, 2018

Related U.S. Application Data

(60) Provisional application No. 62/430,595, filed on Dec. 6, 2016.

(51) Int. Cl.
*G02B 27/01* (2006.01)
*H04N 13/383* (2018.01)
(Continued)

(52) U.S. Cl.
CPC ....... *G02B 27/0172* (2013.01); *G02B 27/017* (2013.01); *G02B 27/0176* (2013.01); *G06F 3/013* (2013.01); *H04N 5/23251* (2013.01); *H04N 5/23258* (2013.01); *H04N 5/23264* (2013.01); *H04N 5/23267* (2013.01); *H04N 13/204* (2018.05); *H04N 13/344* (2018.05); *H04N 13/383* (2018.05);
(Continued)

(58) Field of Classification Search
None
See application file for complete search history.

(56) References Cited

U.S. PATENT DOCUMENTS

| 8,736,692 B1* | 5/2014 | Wong | G06F 3/013 |
| | | | 348/208.4 |
| 2011/0228051 A1* | 9/2011 | Dedeoglu | H04N 13/296 |
| | | | 348/46 |

(Continued)

FOREIGN PATENT DOCUMENTS

| JP | 2014094186 A | 5/2014 |
| WO | 2015048839 A1 | 4/2015 |
| WO | 2015103444 A1 | 7/2015 |

OTHER PUBLICATIONS

EP Search Report for Application No. 17200621.5-1209 dated Feb. 20, 2018.
(Continued)

*Primary Examiner* — Lindsay J Uhl

(57) ABSTRACT

A system and method for ocular stabilization of video images is disclosed. While capturing video images in a forward field of view with a forward-facing video camera of a wearable head-mountable device (HMD), binocular eye-gaze directions of left and right eyes of a user of the HMD may be obtained with an eye-tracking device of the HMD. Based on the obtained binocular eye-gaze directions of left and right eyes of the user of the HMD, convergent gaze directions of the user may be determined as a function of time during an interval concurrent with the capturing of the video images. The captured video images may then be stabilized by compensating for motion of the forward-facing video camera with an intersection of the convergent gaze directions of the user with an image plane of the forward-facing video camera.

14 Claims, 7 Drawing Sheets

(51) Int. Cl.
*H04N 5/232* (2006.01)
*H04N 13/344* (2018.01)
*H04N 13/204* (2018.01)
*G06F 3/01* (2006.01)
*G06K 9/00* (2006.01)
*G06T 19/00* (2011.01)

(52) U.S. Cl.
CPC .................. *G02B 2027/014* (2013.01); *G02B 2027/0134* (2013.01); *G02B 2027/0138* (2013.01); *G02B 2027/0178* (2013.01); *G02B 2027/0187* (2013.01); *G06K 9/00671* (2013.01); *G06T 19/006* (2013.01)

(56) References Cited

U.S. PATENT DOCUMENTS

| | | |
|---|---|---|
| 2013/0178287 A1 | 7/2013 | Yahav |
| 2015/0235355 A1* | 8/2015 | Mullins .............. G02B 27/0101 345/633 |
| 2017/0358141 A1* | 12/2017 | Stafford ................ G06F 3/0482 |

OTHER PUBLICATIONS

Search Report for Application No. PCT/US2017/060563 dated Feb. 22, 2018.
UK Search Report Under Section 17 for Application No. GB1719623.9 dated May 23, 2018.

* cited by examiner

OCULAR VIDEO STABILIZATION

CROSS-REFERENCE TO RELATED APPLICATIONS

This application claims priority under 35 U.S.C. § 119(e) to U.S. Provisional Patent Application Ser. No. 62/430,595, filed on Dec. 6, 2016, which is incorporated herein in its entirety by reference.

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

SUMMARY

In one aspect, an example embodiment presented herein provides, in a wearable head-mountable device (HMD), a computer-implemented method comprising: while capturing video images in a forward field of view (FOV) with a forward-facing video camera of and attached to the HMD, obtaining stereoscopic video images of left and right eyes of a user of the HMD with left and right eye-facing video cameras of and attached to the HMD; based on the obtained stereoscopic video images of the left and right eyes of the user of the HMD, determining convergent gaze directions of the user as a function of time during an interval concurrent with the capturing of the video images; and stabilizing the captured video images by compensating for motion of the forward-facing video camera with respect to the convergent gaze direction with an intersection of the convergent gaze directions of the user with an image plane of the forward-facing video camera.

In another aspect, an example embodiment presented herein provides, in a wearable head-mountable device (HMD), a computer-implemented method comprising: while capturing video images in a forward field of view (FOV) with a forward-facing video camera of and attached to the HMD, obtaining eye-gaze directions of at least one of a left and a right eye of a user of the HMD with an eye-tracking device of and attached to the HMD; based on the obtained eye-gaze directions, determining gaze directions of the user as a function of time during an interval concurrent with the capturing of the video images; and stabilizing the captured video images by compensating for motion of the forward-facing video camera with respect to the gaze directions with an intersection of the gaze directions of the user with an image plane of the forward-facing video camera.

In still another aspect, an example embodiment presented herein provides head-mountable device (HMD) comprising: a forward-facing video camera; an eye-tracking device; a processor; and memory storing instructions that, when executed by the processor, cause the HMD to carry out operations including: while capturing video images in a forward field of view (FOV) with the forward-facing video camera, obtaining binocular eye-gaze directions of left and right eyes of a user of the HMD with the eye-tracking device; based on the obtained binocular eye-gaze directions of the left and right eyes of the user of the HMD, determining convergent gaze directions of the user as a function of time during an interval concurrent with the capturing of the video images; and stabilizing the captured video images by compensating for motion of the forward-facing video camera with respect to the convergent gaze directions with an intersection of the convergent gaze directions of the user with an image plane of the forward-facing video camera.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1A:
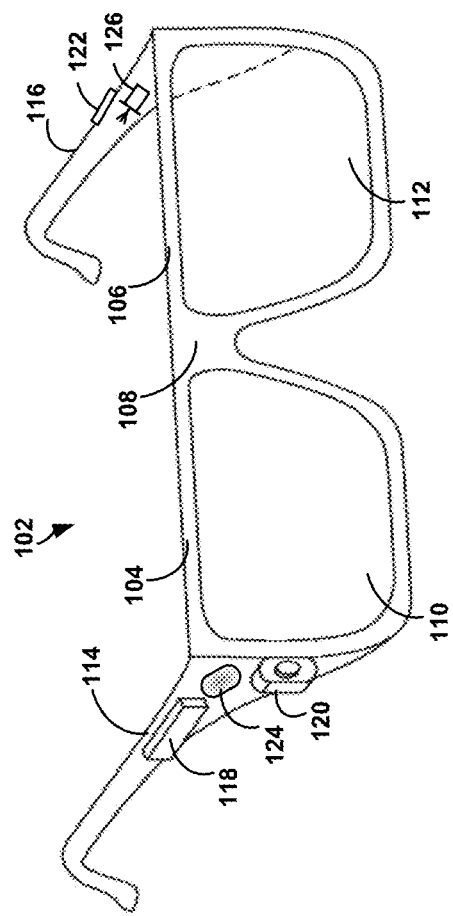
FIG. 1A is a first view of an example wearable head-mountable device, in accordance with an example embodiment.

A head-mountable device (HMD) may include a forward-facing video camera configured for capturing video images or video data (or just "video") in a forward field of view (FOV) of a user or wearer of the HMD. Video captured by a forward-facing video camera of head-mountable device (HMD) can be unstable and shaky, especially if the user is moving around. Known techniques for stabilizing shaky and/or unstable video images typically involve ancillary measurements indicative of the motion of the video camera during capture, such as measurements obtained from motion sensors or the like. Other techniques may involve some form of analytical modeling of motion to approximate corrections to shaky and/or unstable video images. However, these techniques can be computationally expensive and lacking as reliable indicators of actual motion of a video camera during video capture.

In contrast to sensor-based measurements or model-based approximations of video camera motion, a user's eye motion and gaze direction can provide a natural basis for correcting motion of a video camera affixed to a HMD worn by the user. Generally a user's eye or eyes (is) are fixated at certain objects or points within the FOV, and the brain moves the eyes counter to the head in order to maintain focus on surrounding objects. Thus, the user's eye movement and gaze direction during video capture can provide an indication of a point or points of interest in the forward field of view (FOV), which in turn can be used to determine reliable and accurate compensation for motion of the forward-facing video camera, enabling natural and computationally inexpensive video stabilization.

In an example embodiment, gaze information extracted by tracking the eyes can be "collided" to determine a point of gaze convergence in the user's forward FOV. The convergence point can then be mapped to an image plane of the forward-facing video camera. For example, the mapping can identify a pixel or group of pixels that correspond to the user's convergent gaze direction. Doing so provides instantaneous coordinates on the video frame of the user's convergent gaze direction. As a function of time, this technique therefore provides a trajectory across pixels in the image plane of the forward-facing video camera that represents motion of the forward-facing video camera with respect to the user's essentially fixed gaze direction. The trajectory thus corresponds to a path of motion that compensates for motion of the video camera. Applying the trajectory as a correction to the pointing direction of the forward-facing camera can therefore stabilize the video images captured by the forward-facing video camera.

In an example embodiment, a wearable HMD may include a forward-facing camera for capturing video images of the forward FOV of a wearer (user) of the HMD, and may also include two eye-facing cameras for obtaining eye movement and gaze direction of the left and right eyes of the wearer. More particularly, a left eye-facing camera can capture video images of the wearer's left eye, and a right eye-facing camera can capture video images of the wearer's right eye. Video capture of the left and right eyes can be carried out concurrently with video capture of the forward FOV by the forward-facing video camera. The left and right video images can be combined to produce or generate stereoscopic video images of the wearer's eyes. Converging the respective gaze directions of the left and right eyes as captured in the stereoscopic video images provides the wearer's convergent gaze direction, which can then be mapped to the image plane of the forward-facing video camera for image stabilization, as described above.

In an example embodiment, the correction or compensation for motion of the forward-facing video camera can be applied in real-time, as the forward-facing video images of the FOV and the stereoscopic video images of the wearer's eyes are concurrently captured. In an additional or alternative example embodiment, the correction or compensation for motion of the forward-facing video camera can be applied at time subsequent to the concurrent video image capture.

In an example embodiment, the above technique can be applied to tracking just one eye of the wearer of the HMD. In this case, the determined gaze direction may not necessarily correspond to a convergent gaze direction. However, it may still provide a trajectory in the image plane of the forward-facing video camera that may be used for correction for motion of the forward-facing video camera. When the gaze direction is toward a very distant point (e.g., "infinite focal distance"), the difference between applying the technique to one eye or two eyes may become insignificant.

2. Example Systems and Network

In general, example embodiments may be implemented in or may take the form of a wearable computer, and will be illustrated as such herein by way of example. In particular, an example embodiments may be implemented in association with or take the form of a head-mountable device (HMD), which may be communicatively connected with computing system that exchanges data from an HMD, such as a cloud-based server system that may be part of or connected to a network.

However, example embodiments may also be implemented in or take the form of other devices, such as a mobile phone, among others. Example embodiments may further include and/or may take the form of a non-transitory computer readable medium (or media), which has program instructions stored thereon that are executable by one or more processors to provide the functionality described herein. In addition, example embodiments may also further include and/or take the form of a device such as a wearable computer or mobile phone, or a subsystem of such a device, which includes such a non-transitory computer readable medium having such program instructions stored thereon.

a. Example Wearable Computing System

In accordance with an example embodiment, a wearable computing system may comprise various components, including one or more processors, one or more forms of memory, one or more sensor devices, one or more I/O devices, one or more communication devices and interfaces, and a head-mountable device (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mountable device" (or "wearable HMD") or just "head-mountable device" (or "HMD") will be used herein to refer to a wearable computing system, in either an integrated (unified package) form, a distributed (or partially distributed) form, or other wearable form.

FIG. 1A illustrates an example wearable computing system 100 for receiving, transmitting, and displaying data. In accordance with an example embodiment, the wearable computing system 100 is depicted as a wearable HMD taking the form of eyeglasses 102, shown in an exterior-facing view in FIG. 1A. However, it will be appreciated that other types of wearable computing devices could additionally or alternatively be used, including a monocular display configuration having only one lens-display element.

As illustrated in FIG. 1A, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed, either directly or by way of a reflecting surface. In addition, at least a portion of each lens elements 110 and 112 may be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the wearable computing system 100 may be connected to or be integral to a head-mountable helmet structure. Other possibilities exist as well.

The wearable computing system 100 may also include an on-board computing system 118, a forward-facing video camera 120, a sensor 122, a finger-operable touch pad 124, and a communication interface 126. The on-board computing system 118 is shown to be positioned on the extending side-arm 114 of the eyeglasses 102; however, the on-board computing system 118 may be provided on other parts of the eyeglasses 102. The on-board computing system 118 may include, for example, a one or more processors and one or more forms of memory. The on-board computing system 118 may be configured to receive and analyze data from the video camera 120, the sensor 122, the finger-operable touch pad 124, and the wireless communication interface 126 (and possibly from other sensory devices and/or user interfaces) and generate images for output to the lens elements 110 and 112.

The forward-facing video camera 120 is shown to be positioned on the extending side-arm 114 of the eyeglasses 102; however, the forward-facing video camera 120 may be provided on other parts of the eyeglasses 102. The forward-facing video camera 120 may be configured to capture video images in a forward FOV of a wearer of the HMD at various resolutions or at different frame rates. Video cameras with a small form factor, such as those used in cell phones or webcams, for example, may be incorporated into an example of the wearable system 100. Although FIG. 1A illustrates one forward-facing video camera 120, more video cameras may be used, and each may be configured to capture the same view, or to capture different views. For example, the forward-facing video camera 120 may capture at least a portion of a real-world view perceived by the user. This forward facing image captured by the be forward facing to video camera 120 may then be used to generate an augmented reality where computer generated images appear to interact with the real-world view perceived by the user.

The sensor 122 may be used to measure and/or determine location, orientation, and motion information, for example. Although represented as a single component mounted on the extending side-arm 116 of the eyeglasses 102, the sensor 122 could in practice include more than one type of sensor device or element provided on one or more different parts of the eyeglasses 102.

By way of example and without limitation, the sensor 122 could include one or more of motion detectors (e.g., one or more gyroscopes and/or accelerometers), one or more magnetometers, and a location determination device (e.g., a GPS device). Gyroscopes, accelerometers, and magnetometers may be integrated into what is conventionally called an "inertial measurement unit" (IMU). An IMU may, in turn, be part of an "attitude heading reference system" (AHRS) that computes (e.g., using the on-board computing system 118) a pointing direction of the HMD from IMU sensor data, possibly together with location information (e.g., from a GPS device). Accordingly, the sensor 122 could include or be part of an AHRS. Other sensing devices or elements may be included within the sensor 122 and other sensing functions may be performed by the sensor 122.

The finger-operable touch pad 124, shown mounted on the extending side-arm 114 of the eyeglasses 102, may be used by a user to input commands. However, the finger-operable touch pad 124 may be positioned on other parts of the eyeglasses 102. Also, more than one finger-operable touch pad may be present on the eyeglasses 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel to the pad surface, in a direction normal to the pad surface, or both, and may also be capable of sensing a level of pressure applied. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge of the finger-operable touch pad 124. Although not shown in FIG. 1A, the eyeglasses 102 could include one more additional finger-operable touch pads, for example attached to the extending side-arm 116, which could be operated independently of the finger-operable touch pad 124 to provide a duplicate and/or different function.

The communication interface 126 could include an antenna and transceiver device for support of wireline and/or wireless communications between the wearable computing system 100 and a remote device or communication network. For instance, the communication interface 126 could support wireless communications with any or all of 3G and/or 4G cellular radio technologies (e.g., CDMA, EVDO, GSM, UMTS, LTE, WiMAX), as well as wireless local or personal area network technologies such as a Bluetooth, Zigbee, and WiFi (e.g., 802.11A, 802.11B, 802.11g). Other types of wireless access technologies could be supported as well. The communication interface 126 could enable communications between the wearable computing system 100 and one or more end devices, such as another wireless communication device (e.g., a cellular phone or another wearable computing device), a user at a computer in a communication network, or a server or server system in a communication network. The communication interface 126 could also support wired access communications with Ethernet or USB connections, for example.

Figure 1B:
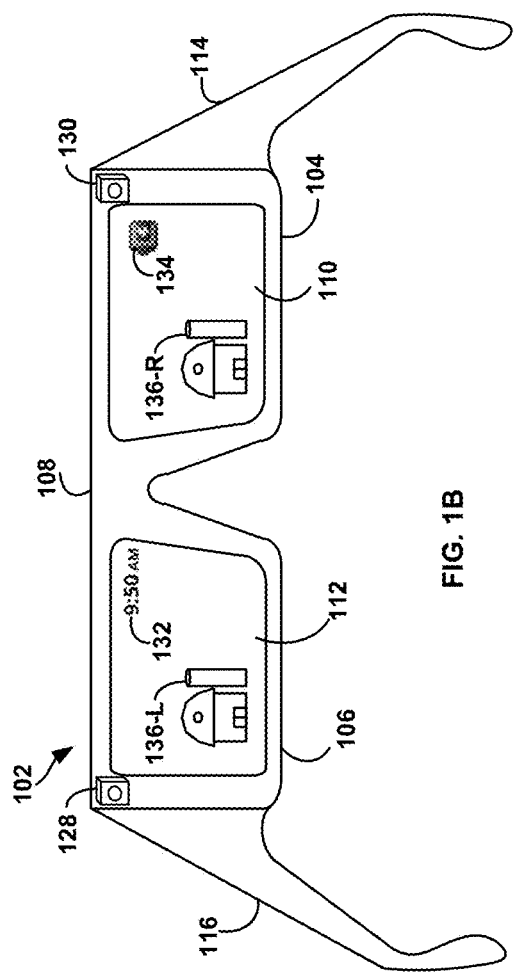
FIG. 1B is a second view of the example wearable head-mountable device of FIG. 1A, in accordance with an example embodiment.

FIG. 1B illustrates an interior-facing view of the wearable computing system 100 of FIG. 1A, representing a view of the HMD presented in a forward FOV of a wearer of the HMD. In addition to a number of components shown in FIG. 1A, FIG. 1B also depicts the eyeglasses 102 as including a first eye-facing video camera 128 coupled to an inside surface of the center frame support 108 and configured to capture real-time video and/or rapid still images of the left eye of a wearer of the HMD 102. Additionally, a second eye-facing video camera 130 is shown coupled to an inside surface of the center frame support 108 and configured to capture real-time video and/or rapid images of the right eye of a wearer of the HMD 102. As described below, real-time images of the left and right eyes of the wearer may, in combination, yield real-time stereoscopic video images and/or rapid still images, which may be processed and analyzed to provide accurate gaze direction of the wearer of the HMD 102. The processing and analysis may be done in real-time, to produce real-time gaze and eye movement information, and/or at a subsequent time to produce the same or similar information after the fact. In other example embodiments, the eye-facing video cameras 128 and 130 may be replaced or augmented by other forms of devices capable of tracking eye movement and/or acquiring eye-tracking data that may be analyzed to determined gaze direction of a user as a function of time.

Although not necessarily shown in FIG. 1A or 1B, the HMD 102 may include one or more display elements and/or component configured for displaying still and/or video (moving) images in a wearer's forward FOV. Display elements and/or components could include projection elements, such as optical waveguides or the like, for channeling virtual images into a forward FOV where they may appear to a wearer of the HMD. When the HMD 102 is worn by a user or wearer, a forward viewing field may then be seen concurrently through lens elements 110 and 112 with projected or displayed images (such as display images 132 and 134). This is represented in FIG. 1B by the field of view (FOV) object 136-L in the left lens element 112 and the same FOV object 136-R in the right lens element 110. The combination of displayed images and real objects observed in the FOV may be one aspect of augmented reality, referenced above. In addition, images could be generated for the right and left lens elements produce a virtual three-dimensional space when right and left images are synthesized together by a wearer of the HMD. Virtual objects could then be made to appear to be located in and occupy the actual three-dimensional space viewed transparently through the lenses.

In alternative embodiments, other types of display elements may also be used. For example, lens elements 110, 112 may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 1A and 1B, the wearable system 100 can also include one or more components for audio output. For example, wearable computing system 100 can be equipped with speaker(s), earphone(s), and/or earphone jack(s). Other possibilities exist as well.

While the wearable computing system 100 of the example embodiment illustrated in FIGS. 1A and 1B is configured as a unified package, integrated in the HMD component, other configurations are possible as well. For example, although not explicitly shown in FIGS. 1A and 1B, the wearable computing system 100 could be implemented in a distributed architecture in which all or part of the on-board computing system 118 is configured remotely from the eyeglasses 102. For example, some or all of the on-board computing system 118 could be made wearable in or on clothing as an accessory, such as in a garment pocket or on a belt clip. Similarly, other components depicted in FIGS. 1A and/or 1B as integrated in the eyeglasses 102 could also be configured remotely from the HMD component. In such a distributed architecture, certain components might still be integrated in HMD component. For instance, one or more sensors (e.g., a magnetometer, gyroscope, etc.) could be integrated in eyeglasses 102.

In an example distributed configuration, the HMD component (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

Figure 1C:
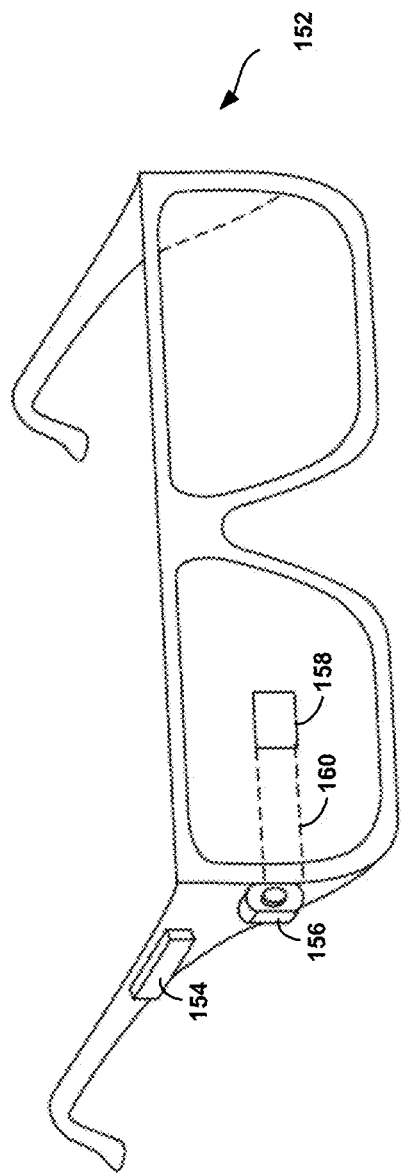
FIG. 1C illustrates another example wearable head-mountable device, in accordance with an example embodiment.

FIG. 1C illustrates another wearable computing system according to an example embodiment, which takes the form of a HMD 152. The HMD 152 may include frame elements and side-arms such as those described with respect to FIGS. 1A and 1B. The HMD 152 may additionally include an on-board computing system 154 and a forward-facing video camera 156, such as those described with respect to FIGS. 1A and 1B. The video camera 156 is shown mounted on a frame of the HMD 152. However, the video camera 156 may be mounted at other positions as well. Although not explicitly shown, the HMDs in each of FIGS. 1C and 1D could include eye-facing video cameras and/or other devices or elements configured for tracking eye movement of a wearer of the HMD.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
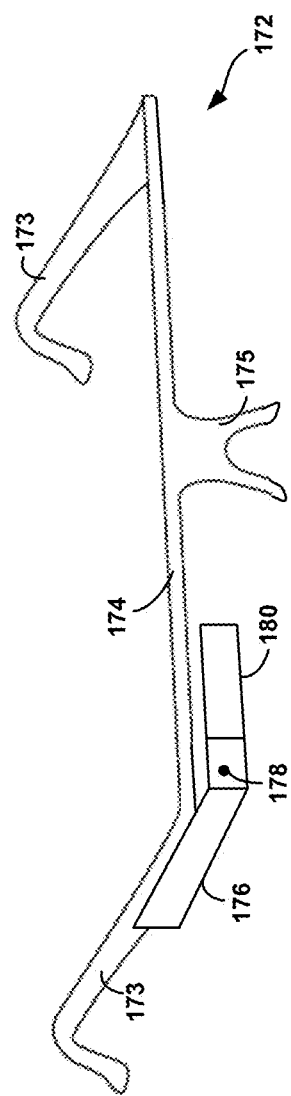
FIG. 1D illustrates still another example wearable head-mountable device, in accordance with an example embodiment.

FIG. 1D illustrates another wearable computing system according to an example embodiment, which takes the form of a HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
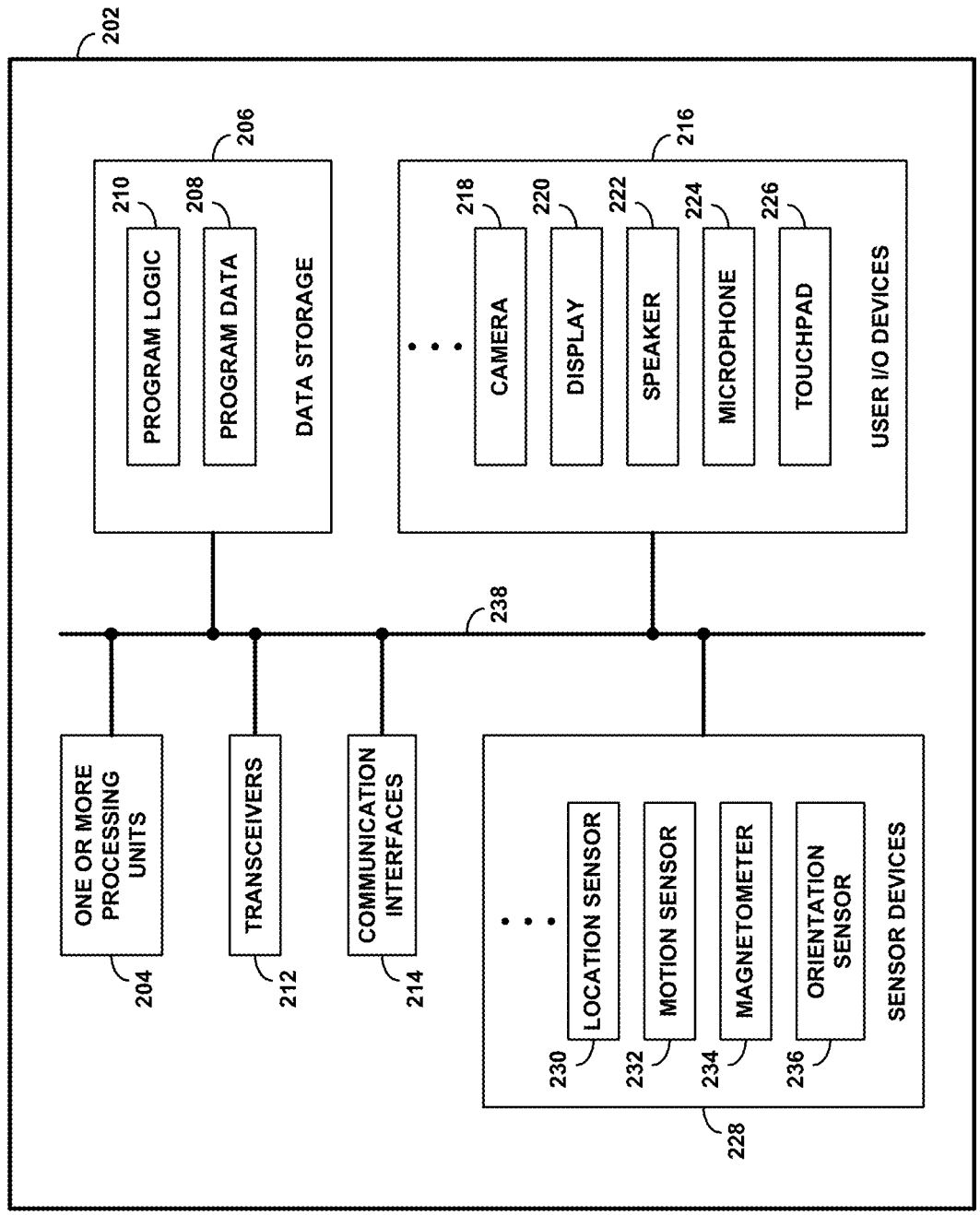
FIG. 2 is block diagram of a wearable head-mountable device, in accordance with an example embodiment.

FIG. 2 is a block diagram depicting functional components of an example wearable computing system 202 in accordance with an example embodiment. As shown in FIG. 2, the example wearable computing system 202 includes one or more processing units 204, data storage 206, transceivers 212, communication interfaces 214, user input/output (I/O) devices 216, and sensor devices 228, all of which may be coupled together by a system bus 238 or other communicative interconnection means. These components may be arranged to support operation in accordance with an example embodiment of a wearable computing system, such as system 100 shown in FIGS. 1A and 1B, or other a wearable HMD The one or more processing units 204 could include one or more general-purpose processors (e.g., INTEL microprocessors) and/or one or more special-purpose processors (e.g., dedicated digital signal processor, application specific integrated circuit, etc.). In turn, the data storage 206 could include one or more volatile and/or non-volatile storage components, such as magnetic or optical memory or disk storage. Data storage 206 can be integrated in whole or in part with processing unit 204, as cache memory or registers for instance. As further shown, data storage 206 is equipped to hold program logic 208 and program data 210.

Program logic 208 could include machine language instructions (e.g., software code, firmware code, etc.) that define routines executable by the one or more processing units 204 to carry out various functions described herein. Program data 210 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 212 and communication interfaces 214 may be configured to support communication between the wearable computing system 202 and one or more end devices, such as another wireless communication device (e.g., a cellular phone or another wearable computing device), a user at a computer in a communication network, or a server or server system in a communication network. The transceivers 212 may be coupled with one or more antennas to enable wireless communications, for example, as described above for the wireless communication interface 126 shown in FIG. 1A. The transceivers 212 may also be coupled with one or more and wireline connectors for wireline communications such as Ethernet or USB. The transceivers 212 and communication interfaces 214 could also be used support communications within a distributed-architecture in which various components of the wearable computing system 202 are located remotely from one another. In this sense, the system bus 238 could include elements and/or segments that support communication between such distributed components.

As shown, the user I/O devices 216 include a camera 218, a display 220, a speaker 222, a microphone 224, and a touchpad 226. The camera 218 could correspond to the forward-facing video camera 120 and or the eye-facing video cameras 128 and 130 described in the discussion of FIGS. 1A and 1B above. Similarly, the display 220 could correspond to an image processing and display system for making images viewable to a user (wearer) of an HMD. The display 220 could include, among other elements, the first and second projectors 128 and 130 coupled with lens elements 112 and 110, respectively, for generating image displays as described above for FIG. 1B. The touchpad 226 could correspond to the finger-operable touch pad 124, as described for FIG. 1A. The speaker 422 and microphone 224 could similarly correspond to components referenced in the discussion above of FIGS. 1A and 1B. Each of the user I/O devices 216 could also include a device controller and stored, executable logic instructions, as well as an interface for communication via the system bus 238.

The sensor devices 228, which could correspond to the sensor 122 described above for FIG. 1A, include a location sensor 230, a motion sensor 232, one or more magnetometers 234, and an orientation sensor 236. The location sensor 230 could correspond to a Global Positioning System (GPS) device, or other location-determination device (e.g. mobile phone system triangulation device, etc.). The motion sensor 232 could correspond to one or more accelerometers and/or one or more gyroscopes. A typical configuration may include three accelerometers oriented along three mutually orthogonal axes, for example. A similar configuration of three magnetometers can also be used.

The orientation sensor 236 could include or be part of an AHRS for providing theodolite-like functionality for determining an angular orientation of a reference pointing direction of the HMD with respect to a local terrestrial coordinate system. For instance, the orientation sensor could determine an altitude angle with respect to horizontal and an azimuth angle with respect to a reference directions, such as geographic (or geodetic) North, of a forward pointing direction of the HMD. Other angles and coordinate systems could be used as well for determining orientation.

Each of the sensor devices 228 could also include a device controller and stored, executable logic instructions, as well as an interface for communication via the system bus 238.

It will be appreciated that there can be numerous specific implementations of a wearable computing system or wearable HMD, such as the wearable computing system 202 illustrated in FIG. 2. Further, one of skill in the art would understand how to devise and build such an implementation.

b. Example Network

In an example embodiment, an HMD can support communications with a network and with devices in or communicatively connected with a network. Such communications can include exchange of information between the HMD and another device, such as another connected HMD, a mobile computing device (e.g., mobile phone or smart phone), or a server. Information exchange can support or be part of services and/or applications, including, without limitation, uploading and/or downloading content (e.g., music, video, etc.), and client-server communications, among others.

Figure 3:
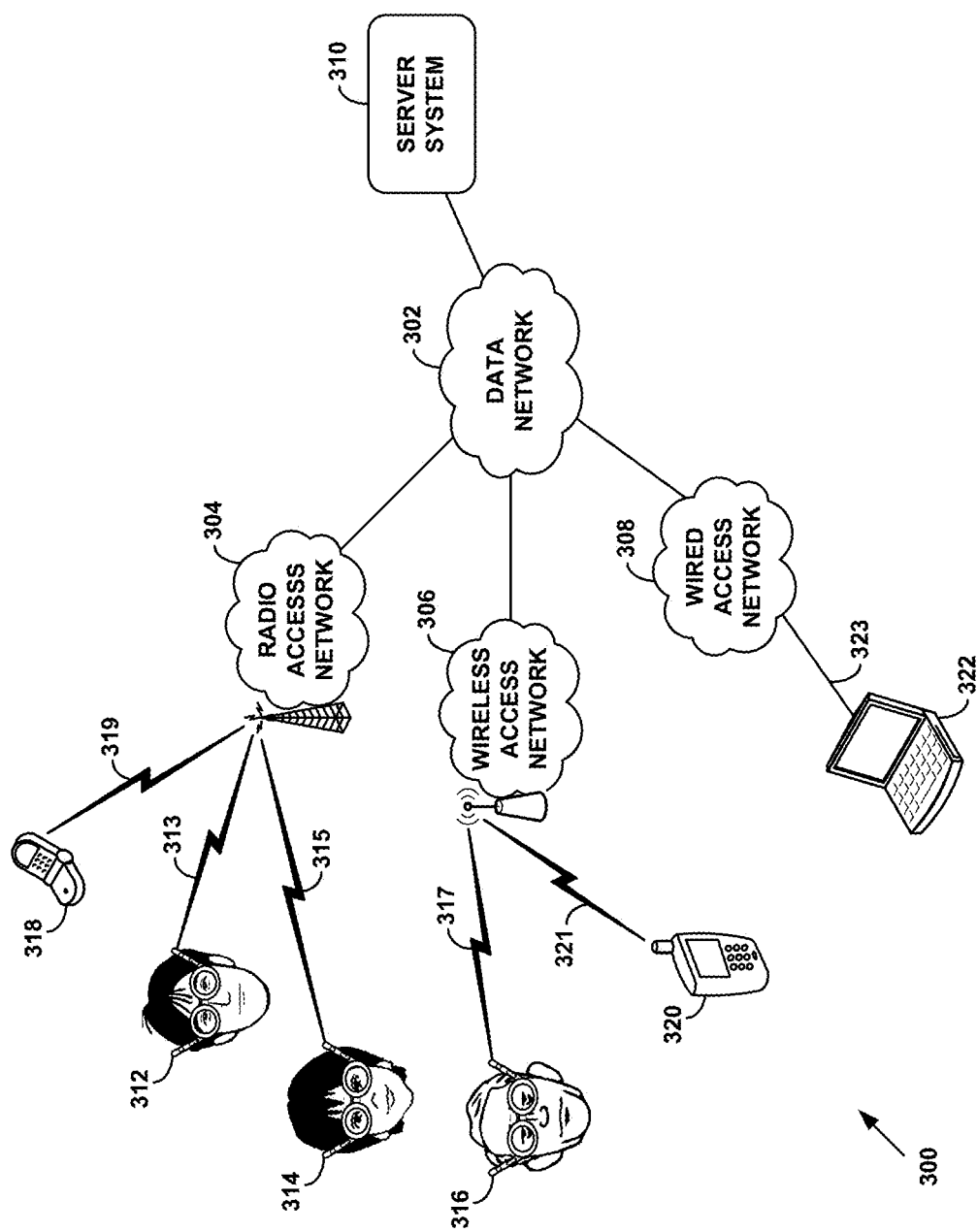
FIG. 3 is a simplified block diagram of a communication network, in accordance with an example embodiment.

FIG. 3 illustrates one view of a network 300 in which one or more HMDs could engage in communications. As depicted, the network 300 includes a data network 302 that is connected to each of a radio access network (RAN) 304, a wireless access network 306, and a wired access network 308. The data network 302 could represent the one or more interconnected communication networks, such as or including the Internet. The radio access network 304 could represent a service provider's cellular radio network supporting, for instance, 3G and/or 4G cellular radio technologies (e.g., CDMA, EVDO, GSM, UMTS, LTE, WiMAX). The wireless access network 306 could represent a residential or hot-spot wireless area network supporting, such as, Bluetooth, ZigBee, and WiFi (e.g., 802.11A, 802.11B, 802.11g). The wired access network 308 could represent a residential or commercial local area network supporting, for instance, Ethernet.

The network 300 also includes a server system 310 connected to the data network 302. The server system 310 could represent a website or other network-based facility for providing one or another type of service to users. For instance, in accordance with an example embodiment, the server system 310 could host an online social networking service or website. As another example, the server system 310 could provide a network-based information search service. As still a further example, the server system 310 could receive eye-tracking data from a HMD, and returned analyzed results to the HMD.

FIG. 3 also shows various end-user and/or client devices connected to the network 300 via one of the three access networks. By way of example, an HMD 312 is connected to the RAN 304 via an air interface 313 (e.g., a 3G or 4G technology), and an HMD 314 is connected to the RAN 304 via an air interface 315 (e.g., a 3G or 4G technology). Also by way of example, an HMD 316 is connected to the wireless access network 306 via an air interface 317 (e.g., a WiFi technology). In addition and also by way of example, a mobile phone 318 is shown connected to the RAN 304 via an air interface 319, a smartphone 320 is shown connected to the wireless access network 306 via an air interface 321, and a laptop computer 322 is shown connected to the wired access network 308 via a wired interface 323. Each of the end-user devices could communicate with one or another network-connected device via its respective connection with the network. It could be possible as well for some of these end-user devices to communicate directly with each other (or other end-user devices not shown).

Each of the HMDs 312, 314, and 316 is depicted as being worn by different user (each user being represented by a cartoon face) in order to signify possible user-related variables, circumstances, and applications that may be associated with each HMD. For instance, the HMD 312 could at one time upload content to an online social networking service, whereas the HMD 314 could at the same or another time send a request to a network-based information search service. Users could interact with each other and/or with the network via their respective HMDs. Other examples are possible as well. For the purposes of most of the discussion herein it is usually sufficient to reference only an HMD without referencing the user (or wearer) the HMD. Explicit reference to or discussion of a user (or wearer) of an HMD will be made as necessary.

c. Example Server System

Figure 4A:
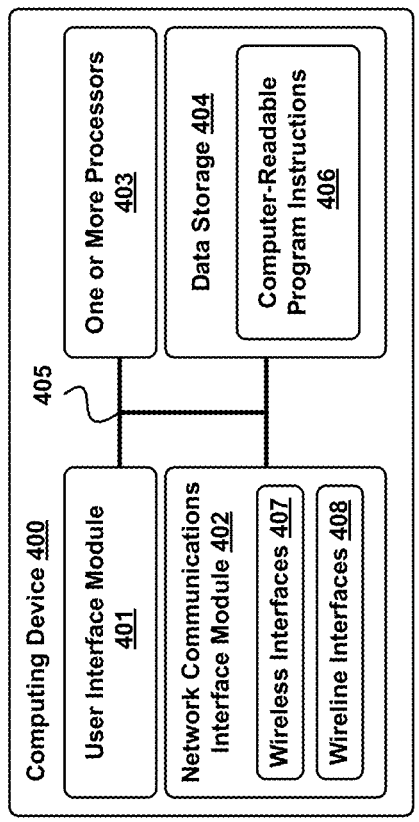
FIG. 4A is a block diagram of a computing device, in accordance with an example embodiment.
Figure 4B:
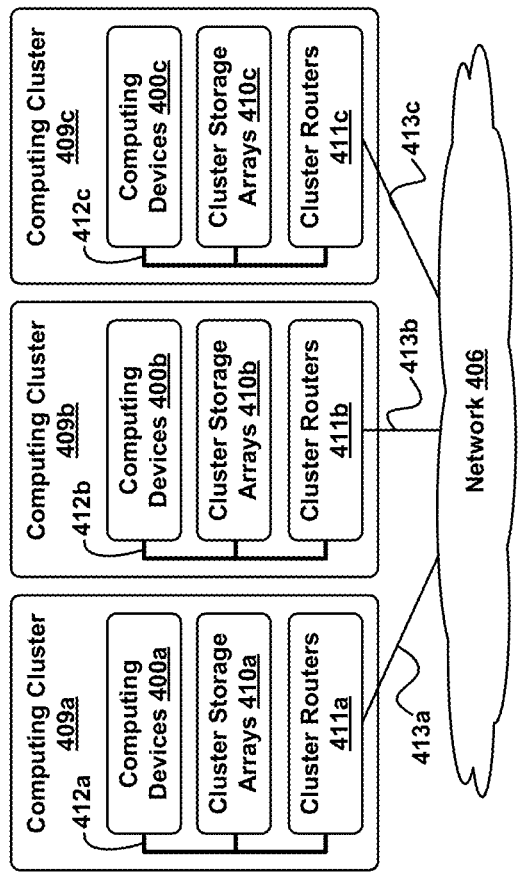
FIG. 4B depicts a network with clusters of computing devices of the type shown in FIG. 4A, in accordance with an example embodiment.

A network server, such as the server system 310 in FIG. 3, could take various forms and be implemented in one or more different ways. FIGS. 4A and 4B illustrate two example embodiments of a server system: an integrated system including a representative computing device (FIG. 4A), and a distributed system (FIG. 4B) including multiple representative computing devices, as well as additional system elements, communicatively connected together.

FIG. 4A is a block diagram of a computing device 400 in accordance with an example embodiment. The computing device 400 can include a user interface module 401, a network-communication interface module 402, one or more processors 403, and data storage 404, all of which can be linked together via a system bus, network, or other connection mechanism 405. The computing device 400 may be any type of device that can receive data and provide information for display in association with the received data. For example, the device 400 may take the form of or be included as part of a wearable computing device, such as the HMDs 102, 152, or 172 described with reference to FIGS. 1A-1D. Further, as noted above, computing device 400 could also take the form of or be included in an integrated server system. Computing device 400 may take other forms and/or be included as part of other systems as well.

The user interface module 401 can be operable to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed.

The network-communications interface module 402 can include one or more wireless interfaces 407 and/or wireline interfaces 408 that are configurable to communicate via a network, such as the network 302 shown in FIG. 3. The wireless interfaces 407 can include one or more wireless transceivers, such as a Bluetooth transceiver, a Wi-Fi transceiver perhaps operating in accordance with an IEEE 802.11 standard (e.g., 802.11A, 802.11B, 802.11g), a WiMAX transceiver perhaps operating in accordance with an IEEE 802.16 standard, and/or other types of wireless transceivers configurable to communicate via a wireless network. The wireline interfaces 408 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 402 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions as described herein.

The data storage 404 can include one or more computer-readable storage media that can be read or accessed by at least one of the processors 403. The one or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 406 and perhaps additional data. In some embodiments, the data storage 404 can additionally include storage required to perform at least part of the herein-described techniques, methods, and/or at least part of the functionality of the herein-described devices and networks.

FIG. 4B depicts a network 406 with computing clusters 409a, 409b, and 409c in accordance with an example embodiment. In FIG. 4B, functions of a network server, such as the server system 310 in FIG. 3, can be distributed among three computing clusters 409a, 409b, and 408c. The computing cluster 409a can include one or more computing devices 400a, cluster storage arrays 410a, and cluster routers 411A, connected together by local cluster network 412a. Similarly, computing cluster 409b can include one or more computing devices 400b, cluster storage arrays 410b, and cluster routers 411B, connected together by local cluster network 412b. Likewise, computing cluster 409c can include one or more computing devices 400c, cluster storage arrays 410c, and cluster routers 411C, connected together by a local cluster network 412c.

In some embodiments, each of computing clusters 409a, 409b, and 409c can have an equal number of computing devices, an equal number of cluster storage arrays, and an equal number of cluster routers. In other embodiments, however, some or all of computing clusters 409a, 409b, and 409c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 410a, 410b, and 410c of computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 411A, 411B, and 411C in the computing clusters 409a, 409b, and 409c can include networking equipment configured to provide internal and external communications for the computing clusters. For example, the cluster routers 411A in the computing cluster 409a can include one or more internet switching and/or routing devices configured to provide (i) local area network communications between the computing devices 400a and the cluster storage arrays 401A via the local cluster network 412a, and/or (ii) wide area network communications between the computing cluster 409a and the computing clusters 409b and 409c via the wide area network connection 413a to the network 406. The cluster routers 411B and 411C can include network equipment similar to the cluster routers 411A, and the cluster routers 411B and 411C can perform similar networking functions for the computing clusters 409b and 409b that the cluster routers 411A perform for the computing cluster 409a.

3. Video Stabilizing Based on Eye Movement and Gaze Direction

A user of a HMD may acquire video data with a forward-facing camera while wearing the HMD. For a configuration such as the one shown in FIGS. 1A and 1B, the forward-facing video camera (e.g. forward-facing video camera 120) has a FOV direction that is fixed with respect to the HMD, which itself will typically remain in a fixed orientation with respect to the wearer. As such, the FOV direction of the forward-facing video camera will move with the HMD, which in turn will move with the wearer. The resulting video images captured will therefore include the wearer's motion. The motion of the wearer, transferred into the video images, can make the video images appear choppy or otherwise unstable when they are viewed during playback.

In general, a person's eye-gaze direction will tend to track a given point or given direction in their FOV as they may move about with respect to the given point or given direction. This typically holds true at least over durations comparable to those over which the person's movement occurs, and for head and/or body motions that are not so large as to exceed a range of eye motion within which the eye-gaze direction can remain fixed on the given point. The ability and tendency for this type of relatively fixed gaze, which effectively compensates for the body's motion, is a natural function of the brain in its processing of visual data and controlling of eye movement. It may include both conscious and subconscious components—e.g., an aware decision to maintain a fixed gaze as well as involuntary gaze fixation. For most practical purposes, it is sufficient to consider movement of just a wearer's face when discussing relative motion and/or orientation between the forward FOV of a video camera affixed to a HMD and the gaze direction of the wearer of the HMD. Unless specified otherwise, movement of a wearer of a HMD and movement (e.g., translation and/or change of orientation) of the wearer's face will be referred to interchangeably herein.

In accordance with example embodiments, a head-mountable device, such as the wearable computing systems illustrated in FIGS. 1A-1D, may utilize eye-gaze tracking of a wearer of the HMD to determine eye-gaze direction as a function of time during video capture with a forward-facing video camera to stabilize the captured video images. Eye-gaze tracking may be accomplished using one or more eye-tracking components or devices of the HMD, such as the eye-facing video cameras 128 and 130, to follow and measure eye motion. While the acquisition and analysis of eye-tracking measurements and data may use physical resources of the HMD (e.g., eye-facing camera operation, processing power, etc.), the gaze-direction measurements themselves represent information provided at no cost to any HMD components, but rather for "free" by virtue of the natural brain function of the wearer of the HMD. The gaze-direction measurements may also be considered "self-referential," since they refer directly to the point or region of interest in the forward FOV.

In a representative scenario in which the forward-facing direction of a HMD wearer's face moves with respect to an initial direction in the forward FOV, while the wearer's eyes remain fixed (or nearly so) in the initial direction by moving counter to the wearer's face motion, the wearer's eye motion may be applied to captured video data to compensate for motion of a video image plane with respect to the initial direction. More specifically, video image data are typically detected and captured in an image plane normal (i.e., perpendicular) to the FOV direction. Thus, motion of the forward-facing video camera with respect to the initial direction will cause the FOV to move across the image plane in correspondence with the motion. This motion across the image plane while video data are being detected and captured is what can produce jumpy, choppy, or otherwise unstable video images, particularly if the motion of forward-facing video camera is unintentional or otherwise merely incidental to the wearer's motion.

In accordance with example embodiments, the wearer's eye motion can be mapped to the image plane so as to compensate for the motion of the FOV across the image plane. More particularly, as the captured video data are processed, the mapped eye movement can be used to effectively reposition the video images to where they would have appeared in the image plane in the absence of the wearer's motion. This repositioning can be done in real-time or in post-capture processing. In either case, the result is a stabilized video. Since the motion compensation uses eye-gaze direction as a function of time, this technique is referred to as ocular video stabilization.

Figure 5:
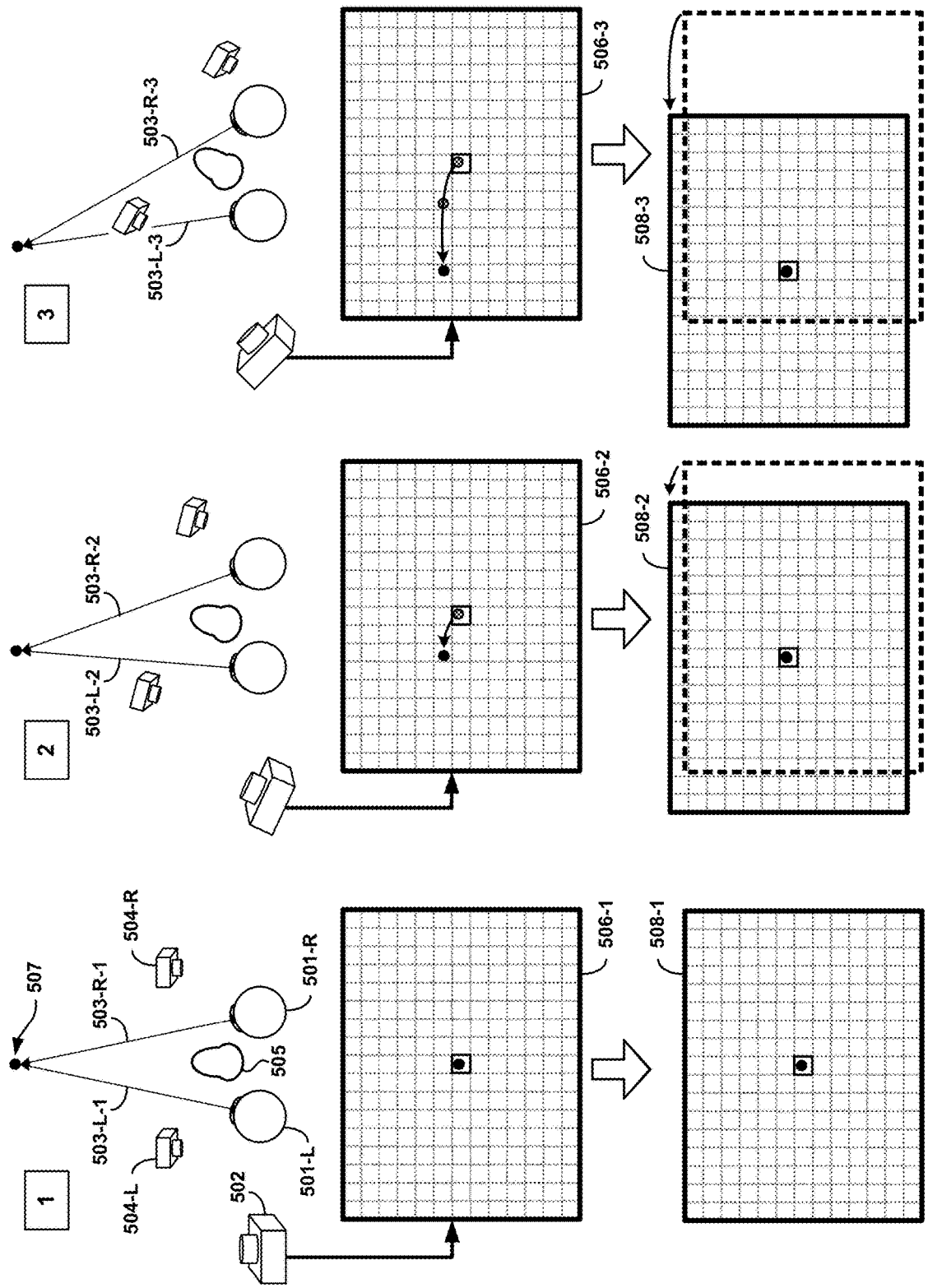
FIG. 5 is a conceptual illustration of example of video stabilization base on eye movement, in accordance with an example embodiment.

FIG. 5 is a conceptual illustration of ocular video stabilization, in accordance with example embodiments. By way of example, FIG. 5 shows three sequential time instances during video capture with a forward-facing video camera 502; the three time instances are arranged in three panels across the figure, from left to right, and labeled 1, 2, and 3, respectively. Each panel shows a pair of disembodied eyes 501-L (left eye) and 501-R (right eye) viewed from above. The eyes have a binocular gaze fixed on a point 507 in the forward FOV. A disembodied cartoon nose 505 in each panel is shown to indicate a pointing direction of an associated (but unseen) face with respect to the point 507 and an angular orientation of the eyes with respect to the face. The different "nose-pointing" directions across the panels may be taken to represent movement (e.g., changing orientation) of the face from one panel to the next. Also in each panel, an eye-facing video camera 504-L tracks motion of the left eye 501-L, and an eye-facing video camera 504-R tracks motion of the right eye 501-R. As shown, the angular orientation of the forward-facing video camera 502 and the eye-facing video cameras 504-L and 505-R track with the "nose-pointing" direction. This corresponds to the generally fixed orientation of the HMD with respect to the wearer's head. For the sake of brevity in the figure, these numeric labels appear only in the first panel.

Evidently and by way of example, the orientation of the nose 505 (and the unseen face), together with the forward-facing video camera 502 and the eye-facing video cameras 504-L and 505-R, changes from one panel to the next in order from left to right in FIG. 5. At the same time, the gaze direction of the left and right eyes stays fixed on the point 507. This is represented by the left and right gaze directions 503-L-1 and 503-R-1 in panel 1, 503-L-2 and 503-R-2 in panel 2, and 503-L-3 and 503-R-1 in panel 3.

The point 507 does not necessarily correspond to a spatial location of an actual physical object (although it could), but rather a point of convergence of the gaze of the left and right eyes. As such, it may be considered a geometrical construct that can be determined from general principles of trigonometry, where the distance between two eyes forms a baseline, and gaze direction of each eye of a wearer can be considered respective angles referenced to a plane containing the baseline, for example. A line-of-sight distance to the convergent point can then be determined as well. For practical purposes of computation, it is more convenient to define the gaze direction of each eye of a wearer of a HMD with respect to one or more fixed positions on the HMD. For example, a line of sight from the left eye 501-L to a center point in an image plane of the eye-facing video camera 504-L may define a reference direction for measure the orientation of the left eye, and similarly for the right eye 504-R with the eye-facing video camera 504-R. Note that for very distant points, the gaze directions may not converge or intersect. In any case, the binocular gaze direction of a wearer of an HMD can be considered the center of the wearer's FOV. Tracking binocular eye-gaze direction can therefore provide a reference direction (e.g., the center of the wearer's FOV) that can be used correct for motion of the FOV of the forward-facing video camera away from the wearer's FOV.

FIG. 5 also depicts the position of the point 507 in the image plane of the forward-facing camera 502 for each of the panels 1, 2, and 3, as well as how motion of the position in the image plane is compensated for, in accordance with example embodiments. Specifically, in panel 1, an image plane 506-1 is shown directly below the illustrative eyes 501-L and 501-R. The image plane is depicted as two-dimensional grid, meant to represent an array of pixels; the size of the grid (number of pixels in each of dimension) as shown is arbitrary, intended only to convey a conceptual illustration. A black dot in a pixel near the grid center represents the image position of the point 507. That is, the black dot in the center of the image plane 506-1 represents binocular eye-gaze direction of the wearer mapped to a pixel location in the image plane.

The same image plane is shown panel 2, but relabeled 506-2 to signify that its orientation with respect to the point 507 has changed with the changed orientation of the forward-facing video camera 502. As a result of the change in orientation, the image position of the point 507, again shown as a black dot, has moved to a different pixel than in panel 1. A gray dot shows the previous pixel location of the point 507, and a curved arrow from the gray dot to the black dot represents a trajectory of motion of the image of the point 507 in the image plane.

In panel 3, the same image plane is again shown, but now relabeled 506-3 to signify a further change in orientation with respect to the point 507 with the further changed orientation of the forward-facing video camera 502. As a result of the further change in orientation, the image position of the point 507, still shown as a black dot, has moved to still a different pixel than in panel 2. Two grays dot shows the previous pixel locations of the point 507, and a curved arrow from through the gray dots to the black dot represents a further trajectory of motion of the image of the point 507 in the image plane. The trajectories in panels 2 and 3 thus represent motion of the point 507 across the image plane that results from motion of the wearer's face as the forward-facing video data are being acquired. That is, the trajectories trace motion of the FOV of the forward-facing video camera with respect to the center of the wearer's FOV as determined from the binocular eye-gaze direction of the wearer.

Compensation of motion of the image of the point 507 across the image plane is shown conceptually in repositioned image planes 508-1, 508-2, and 508-3 depicted respectively beneath each of the image plane representations 506-1, 506-2, and 506-3. By way of example, panel 1 is taken to represent an initial FOV orientation of the wearer's face and of the forward-facing video camera 502 with respect to the point 507. As such, there is zero (no) shift of the repositioned image plane 508-1 with respect to the image plane 506-1.

However, in panel 2, the repositioned image plane 508-2 is shifted with respect to the image plane 506-2 in correspondence with the trajectory in the image plane 506-2 of the point 507. As shown, the shift causes the point 507 to appear in the central pixel location in the repositioned image plane 508-2, which is the same as the initial pixel location in the image plane 506-1, at the start of the illustrated motion. A dashed rectangle in panel 2 represents the original (unshifted) position of the image plane.

In panel 3, the repositioned image plane 508-3 is shifted with respect to the image plane 506-3 in correspondence with the trajectory in the image plane 506-3 of the point 507. As shown, the shift causes the point 507 to appear in the central pixel location in the repositioned image plane 508-3, which is again the same as the initial pixel location in the image plane 506-1, at the start of the illustrated motion. A dashed rectangle in panel 3 represents the original (unshifted) position of the image plane.

In accordance with example embodiments, shifting of the image as represented in the repositioned image planes 508-2, 508-2, and 508-3 is applied to all the pixels of the each image plane 506-2, 506-2, and 506-3. As such, the entire FOV captured in video image data can be repositioned to align with the center of the wearer's FOV as determined during video capture. Tracking eye movement of the wearer while the forward FOV video is being captured can be used to determine eye-gaze direction of the left and right eyes, and analytical (geometrical) convergence of the eye-gaze directions yields the binocular or stereoscopic gaze direction as a function of time. The trajectories illustrated in the image plane instance in FIG. 5 represent a mapping of the binocular eye-gaze direction on the image plane instances. Shifting the captured forward-facing video images thus effectively transforms the video images as captured by the moving forward-facing video camera 502 into video images as they would have been captured by a forward-facing video camera that tracked with concurrent eye movement. The result is ocularly-stabilized video.

In an example embodiment, eye movement can be tracked as a function of time using the eye-facing video cameras 504-L and 505-R. Other eye-tracking devices and techniques may be employed as well. For example, rapid acquisition of successive still images of the left and right eyes can be processed to determine individual and stereoscopic eye-gaze direction as a function of time. Additional techniques may involve tracking of reflections of controlled spot illuminations of the eye. These and other techniques may be used to determine eye-gaze direction as a function of time during video image capture by a forward-facing video camera of a HMD.

In accordance with example embodiments, shifting or repositioning of captured video image data may be carried out in real time, concurrently with the video capture. Additionally or alternative, the determined stereoscopic eye-gaze direction may be recorded and applied in a shifting operation at a time subsequent to video capture. In the case of real-time, concurrent shift, the repositioning operation can be performed by one or more processors of the HMD, such as the on-board computing system 118 in FIG. 1A or the processor(s) 204 in FIG. 2. For after-the-fact shifting, processing could be carried out by one or more processors of the HMD and/or by a remote processing system, such a server in a network.

As noted, the natural tendency of a person's eye-gaze direction to track an object is a response to relative motion between the eye-gaze direction and the object. As such, the motion of an object in the FOV of a forward-facing camera of a HMD can result from movement of the wearer's face with respect to a FOV position of an object fixed in space, movement of the object through a frame of reference in which the wearer's facial motion/orientation is fixed, or some combination of motion in a common reference frame of both the object and the wearer's face. The example embodiments above are described in terms of motion of a wearer's face with respect to an object or point at a fixed position. This is partly a matter of convenience and partly because the techniques may find somewhat more relevance to motion of a wearer's face, since this type of motion will be transferred directly to the forward-facing video camera, and hence to FOV motion that may be particularly noticeable. However, the principles described can be applied to relative motion arising for any of the above reasons.

By way of example, the point 507 in FIG. 5 could be (on) an object that is moving with respect to the wearer of the HMD, such as a car or plane. If the wearer tracks the object by (predominantly) moving her/his eyes rather than her/his head, then the illustration of FIG. 5 still holds. That is, the FOV of the image plane remains fixed, while the motion of the object translates to motion across the image plane, and eye gaze direction tracks the moving object, keeping it (at least approximately) fixed in the eyes' binocular FOV direction.

In further accordance with example embodiments, motion of an object in the image plane, such as image plane 506-1, 506-2, 506-3, can be distinguished as arising from either motion of the wearer's face or motion of the object in space (or at least predominantly one or the other). Specifically, the techniques described above can be applied to two or more different tracked objects over a time duration of interest. In the context of FIG. 5, this could correspond to two or more instances of point 507, each associated with a different instance of tracking. Determining correlation coefficients between the different trackings can then be used to determine if movement across pixels in the image plane, as shown in the image plane 506-1, 506-2, 506-3, is due to a changing orientation of the HMD in space, or motion one or more gazed objects in space.

In further accordance with example embodiments, correlation of gaze direction and pixel location as a function of time may be used to surmise that a wearer of a HMD is gazing at an object of specific interest to the wearer, as opposed to more random gazes. For example, a wearer who is driving a car may glance about as a matter of routine driving practice, observing adjacent lanes, oncoming traffic, and so on. However, during the course of driving, the wearer may also notice a particular object of interest, such as a billboard or landmark. The durations of various gazes and their correlation with pixel positions in the image plane could be used to distinguish pixels containing objects of interest to the wearer of the HMD from those related to more routine actions or attentions of the wearer.

While the techniques above apply particularly to binocular gaze direction, including the ability to determine line-of-sight distance to an object or point in space, the principles can be adapted to embodiments of tracking gaze direction of just one eye. In such an embodiment, distance determination is not possible, but by configuring a forward-facing camera in very close proximity to a single eye-facing camera, the center of the image plane of the forward-facing camera (or a reference position of the image plane) can be aligned arbitrarily close (or nearly so) to a reference gaze direction of the single eye, as determined by the eye-facing camera. For example, the reference gaze direction can be one that is normal (perpendicular) to the center of an image plane of the eye-facing camera. With this as calibration, the single eye-gaze direction measured by the eye-facing camera can be mapped directly to a gaze direction in the FOV of the forward-facing camera. Although not necessarily as accurate as the binocular technique, image stabilization using single-eye tracking could be less costly than the binocular technique, at least in terms of the hardware and power consumption involved.

Figure 6:
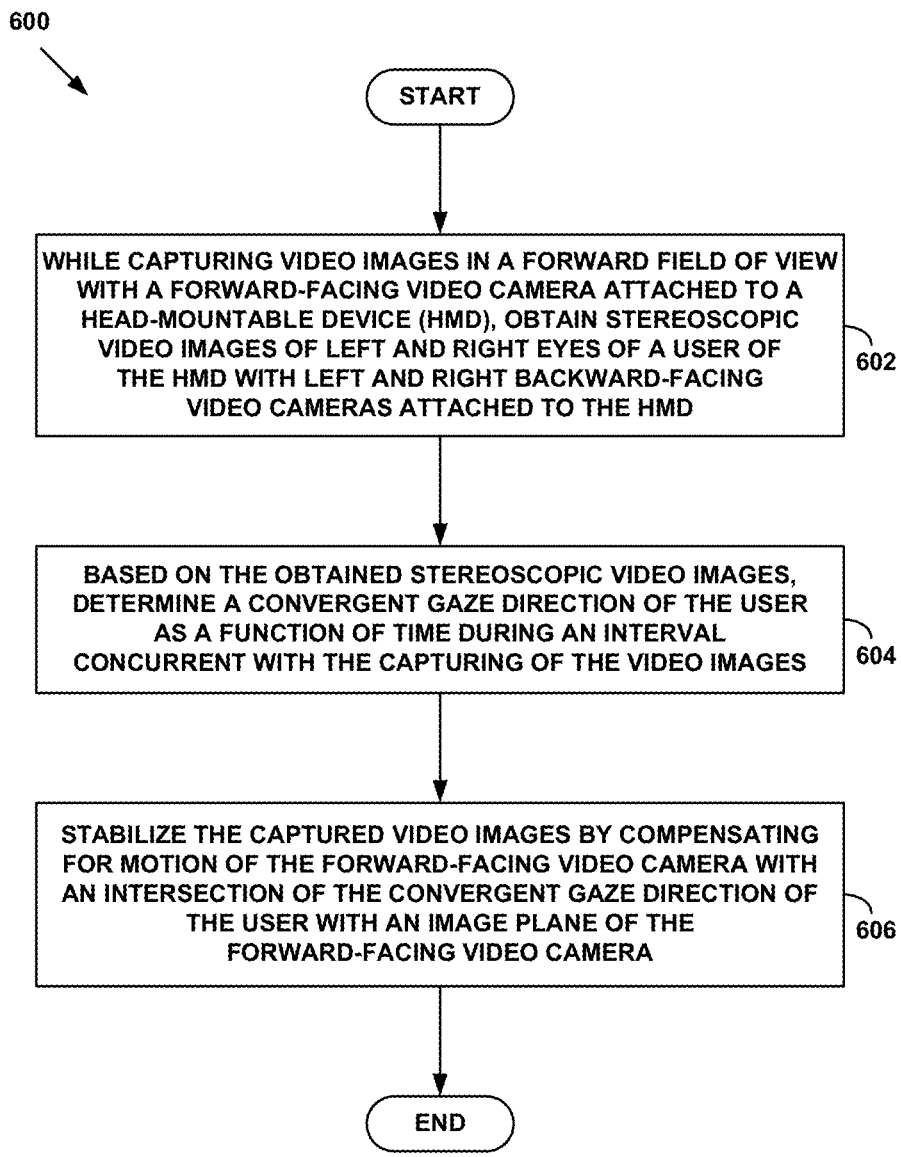
FIG. 6 is a flow chart illustrating an example method of video stabilization base on eye movement, according to an example embodiment.

FIG. 6 is a flowchart illustrating an example embodiment of a method 600 in a wearable computing system, such as a wearable HMD, for ocular video stabilization, such as that described above in conceptual operational terms. The example method 600 can be implemented on a wearable HMD equipped with a forward-facing video camera, a left and right eye-facing video camera, one or more processors, and memory storing instructions that can be executed by the one or more processors to cause the HMD to carry out various operation of the method, as described below. The memory could be some form of non-transitory tangible computer readable storage medium, such as magnetic or optical disk, or the like, and the instructions could be provided for transfer to the wearable head-mountable device's memory, a server's memory, or some both, during manufacture, configuration, or other procedure(s) used for preparing the wearable head-mountable device and/or the server for operation. Various portions of the method could also be implemented on a server (or other computing device or platform) external to the HMD. An example embodiment of such a method is described below.

As shown, at step 602, while the forward-facing video camera of the HMD is capturing video images in a forward field of view (FOV) of the forward-facing video stereoscopic video images of left and right eyes of a user of the HMD may be obtained with the left and right eye-facing video cameras of the HMD.

At step 604, the obtained stereoscopic video images of the left and right eyes of the user of the HMD are used to determine a convergent gaze direction of the user as a function of time during an interval that is concurrent with the capturing of the video images.

At step 606, the captured video images are stabilized by compensating for motion of the forward-facing video camera with respect to the convergent gaze direction with an intersection of the convergent gaze direction of the user with an image plane of the forward-facing video camera.

In accordance with example embodiments, determining the convergent gaze direction of the user as a function of time during the interval concurrent with the capturing of the video images may entail determining respective gaze angles of the left and right eyes of the user as a function of time from the obtained stereoscopic video images of the left and right eyes, and then determining an intersection point of the respective gaze angles projected onto the forward FOV.

Also in accordance with example embodiments, compensating for the motion of the forward-facing video camera with respect to the convergent gaze direction with the intersection of the convergent gaze direction of the user with the image plane of the forward-facing video camera may entail determining the intersection of the convergent gaze direction of the user with the image plane at each of a sequence of two or more times, such as at times of two or more captured video frames. Planar coordinates in the image plane of each intersection of the sequence may then be determined, and one intersection of the sequence may be specified as a reference point in the image plane. The video image captured at each respective time of the one or more sequence times may then be shifted to align the planar coordinates of the intersection at the respective time with the planar coordinates of the reference point.

In further accordance with example embodiments, the image plane may include a regular array of pixels, such that determining the planar coordinates in the image plane of each intersection of the sequence entails determining pixel coordinates for each intersection point of the sequence. In this configuration, shifting the video image captured at each respective time of the one or more sequence times may to align the planar coordinates of the intersection at the respective time with the planar coordinates of the reference point may entail shifting the video image captured at each respective time to align the pixel coordinates of the intersection at the respective time with the pixel coordinates of the reference point.

In an example embodiment, compensating for the motion of the forward-facing video camera with the intersection of the convergent gaze direction of the user with the image plane of the forward-facing video camera with respect to the convergent gaze direction may entail determining a trajectory of intersections of the convergent gaze directions with an image plane as a function of time during the interval, and then shifting the video images captured during the interval along the trajectory to align the video images with a common point in the image plane at each instant during the interval.

In further accordance with example embodiments, shifting the video images captured during the interval along the trajectory may entail shifting the video images captured during the interval along the trajectory in real-time as the convergent gaze directions are being determined. Additionally or alternatively, shifting the video images captured during the interval along the trajectory may entail shifting the video images captured during the interval along the trajectory at a time subsequent to when the convergent gaze directions are determined.

It will further be appreciated that the steps shown in FIG. 6 are meant to illustrate operation of an example embodiment. As such, various steps could be altered or modified, the ordering of certain steps could be changed, and additional steps could be added, while still achieving the overall desired operation.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed:

1. In a wearable head-mountable device (HMD), a computer-implemented method comprising:
    while capturing video images in an image plane of a forward-facing video camera of and attached to the HMD, obtaining stereoscopic video images of left and right eyes of a user of the HMD with left and right eye-facing video cameras of and attached to the HMD;
    based on the obtained stereoscopic video images of the left and right eyes of the user of the HMD, determining convergent gaze directions of the user in a forward field of view (FOV) as a function of time during an interval concurrent with the capturing of the video images;
    determining a trajectory of intersections of the convergent gaze directions with the image plane as a function of time during the interval; and
    shifting the captured video images in the image plane along the trajectory to align the video images with a common point in the image plane at each instant during the interval,
    wherein determining the trajectory of intersections of the convergent gaze directions with the image plane as a function of time during the interval comprises:
    determining the intersection of the convergent gaze directions of the user with the image plane at each of a sequence of two or more times;
    determining planar coordinates in the image plane of each intersection of the sequence; and
    specifying one intersection of the sequence as a reference point in the image plane;
    and wherein shifting the captured video images in the image plane along the trajectory to align the video images with the common point in the image plane at each instant during the interval comprises:
    shifting the video image captured at each respective time of the one or more sequence times to align the planar coordinates of the intersection at the respective time with the planar coordinates of the reference point.

2. The method of claim 1, wherein determining the convergent gaze directions of the user in the forward FOV as a function of time during the interval concurrent with the capturing of the video images comprises:
    determining respective gaze angles of the left and right eyes of the user as a function of time from the obtained stereoscopic video images of the left and right eyes; and
    determining an intersection point of the respective gaze angles projected onto the forward FOV.

3. The method of claim 1, wherein the image plane comprises a regular array of pixels,
    wherein determining the planar coordinates in the image plane of each intersection of the sequence comprises determining pixel coordinates for each intersection point of the sequence;
    and wherein shifting the video image captured at each respective time of the one or more sequence times to align the planar coordinates of the intersection at the respective time with the planar coordinates of the reference point comprises shifting the video image captured at each respective time of the one or more sequence times to align the pixel coordinates of the intersection at the respective time with the pixel coordinates of the reference point.

4. The method of claim 1, wherein shifting the captured video images in the image plane along the trajectory to align the video images with the common point in the image plane at each instant during the interval further comprises shifting the video images captured during the interval along the trajectory during a processing time that is at least one of: (i) real-time as the convergent gaze directions are being determined, or (ii) a time subsequent to when the convergent gaze directions are determined.

5. In a wearable head-mountable device (HMD), a computer-implemented method comprising:
    while capturing video images in an image plane of a forward-facing video camera of and attached to the HMD, obtaining eye-gaze directions of at least one of a left and a right eye of a user of the HMD with an eye-tracking device of and attached to the HMD;
    based on the obtained eye-gaze directions, determining gaze directions of the user in a forward field of view (FOV) as a function of time during an interval concurrent with the capturing of the video images;
    determining a trajectory of intersections of the gaze directions with an image plane as a function of time during the interval; and
    shifting the captured video images in the image plane along the trajectory to align the video images with a common point in the image plane at each instant during the interval,
    wherein determining the trajectory of intersections of the convergent gaze directions with the image plane as a function of time during the interval comprises:
    determining the intersection of the convergent gaze directions of the user with the image plane at each of a sequence of two or more times;
    determining planar coordinates in the image plane of each intersection of the sequence; and
    specifying one intersection of the sequence as a reference point in the image plane;
    and wherein shifting the captured video images in the image plane along the trajectory to align the video images with the common point in the image plane at each instant during the interval comprises:

shifting the video image captured at each respective time of the one or more sequence times to align the planar coordinates of the intersection at the respective time with the planar coordinates of the reference point.

6. The method of claim 5, wherein obtaining the eye-gaze directions of at least one of the left and the right eye of a user of the HMD with the eye-tracking device comprises obtaining binocular eye-gaze directions of the left and right eyes of the user of the HMD with the eye-tracking device;

and wherein determining the gaze directions of the user in the forward FOV as a function of time during the interval concurrent with the capturing of the video images comprises:

determining respective gaze angles of the left and right eyes of the user as a function of time from the binocular eye-gaze directions of the left and right eyes; and determining an intersection point of the respective gaze angles projected onto the forward FOV.

7. The method of claim 5, wherein the image plane comprises a regular array of pixels, wherein determining the planar coordinates in the image plane of each intersection of the sequence comprises determining pixel coordinates for each intersection point of the sequence;

and wherein shifting the video image captured at each respective time of the one or more sequence times to align the planar coordinates of the intersection at the respective time with the planar coordinates of the reference point comprises shifting the video image captured at each respective time of the one or more sequence times to align the pixel coordinates of the intersection at the respective time with the pixel coordinates of the reference point.

8. The method of claim 5, wherein shifting the captured video images in the image plane along the trajectory to align the video images with the common point in the image plane at each instant during the interval further comprises shifting the video images captured during the interval along the trajectory during a processing time that is at least one of: (i) real-time as the convergent gaze directions are being determined, or (ii) a time subsequent to when the convergent gaze directions are determined.

9. The method of claim 6, wherein the eye-tracking device comprises left and right eye-facing video cameras, and wherein obtaining the binocular eye-gaze directions of the left and right eyes of the user of the HMD with the eye-tracking device comprises obtaining stereoscopic video images of left and right eyes of the user of the HMD with the left and right eye-facing video cameras.

10. A head-mountable device (HMD) comprising:
a forward-facing video camera;
an eye-tracking device;
a processor; and
memory storing instructions that, when executed by the processor, cause the HMD to carry out operations including:
while capturing video images in an image plane of the forward-facing video camera, obtaining binocular eye-gaze directions of left and right eyes of a user of the HMD with the eye-tracking device;
based on the obtained binocular eye-gaze directions of the left and right eyes of the user of the HMD, determining convergent gaze directions of the user in a forward field of view (FOV) as a function of time during an interval concurrent with the capturing of the video images;

determining a trajectory of intersections of the convergent gaze directions with an image plane as a function of time during the interval; and shifting the captured video images in the image plane along the trajectory to align the video images with a common point in the image plane at each instant during the interval, wherein determining the trajectory of intersections of the convergent gaze directions with the image plane as a function of time during the interval comprises:

determining the intersection of the convergent gaze directions of the user with the image plane at each of a sequence of two or more times;

determining planar coordinates in the image plane of each intersection of the sequence; and specifying one intersection of the sequence as a reference point in the image plane;

and wherein shifting the captured video images in the image plane along the trajectory to align the video images with the common point in the image plane at each instant during the interval comprises:

shifting the video image captured at each respective time of the one or more sequence times to align the planar coordinates of the intersection at the respective time with the planar coordinates of the reference point.

11. The HMD of claim 10, wherein determining the convergent gaze directions of the user in the forward FOV as a function of time during the interval concurrent with the capturing of the video images comprises:

determining respective gaze angles of the left and right eyes of the user as a function of time from the obtained binocular eye-gaze directions of left and right eyes; and determining an intersection point of the respective gaze angles projected onto the forward FOV.

12. The HMD of claim 10, wherein the image plane comprises a regular array of pixels, wherein determining the planar coordinates in the image plane of each intersection of the sequence comprises determining pixel coordinates for each intersection point of the sequence;

and wherein shifting the video image captured at each respective time of the one or more sequence times to align the planar coordinates of the intersection at the respective time with the planar coordinates of the reference point comprises shifting the video image captured at each respective time of the one or more sequence times to align the pixel coordinates of the intersection at the respective time with the pixel coordinates of the reference point.

13. The HMD of claim 10, wherein shifting the captured video images in the image plane along the trajectory to align the video images with the common point in the image plane at each instant during the interval further comprises shifting the video images captured during the interval along the trajectory during a processing time that is at least one of: (i) real-time as the convergent gaze directions are being determined, or (ii) a time subsequent to when the convergent gaze directions are determined.

14. The HMD of claim 10, wherein the eye-tracking device comprises left and right eye-facing video cameras, and wherein obtaining the binocular eye-gaze directions of the left and right eyes of the user of the HMD with the eye-tracking device comprises obtaining stereoscopic video images of left and right eyes of the user of the HMD with the left and right eye-facing video cameras.

* * * * *